Oct. 10, 1967 C. A. HEATH 3,345,861
ACOUSTICAL TESTING METHOD AND APPARATUS
Original Filed June 3, 1964 2 Sheets-Sheet 1

INVENTOR.
CHARLES A. HEATH
BY
Donnelly, Mentag & Harrington
ATTORNEYS

Oct. 10, 1967    C. A. HEATH    3,345,861
ACOUSTICAL TESTING METHOD AND APPARATUS
Original Filed June 3, 1964    2 Sheets-Sheet 2

INVENTOR.
CHARLES A. HEATH
BY
Donnelly, Meenty & Harrington
ATTORNEYS

United States Patent Office 3,345,861
Patented Oct. 10, 1967

3,345,861
ACOUSTICAL TESTING METHOD AND
APPARATUS
Charles A. Heath, 67799 Forest,
Richmond, Mich. 48062
Continuation of application Ser. No. 372,203, June 3,
1964. This application Feb. 24, 1967, Ser. No. 618,546
2 Claims. (Cl. 73—67.2)

This application is a continuation of Ser. No. 372,203, filed June 3, 1964, now abandoned.

This invention relates to an acoustical method and apparatus and, more particularly, to a method and apparatus employing acoustical energy for testing trees, wood posts and poles, which method and apparatus is particularly suitable for utility poles.

Utility companies usually inspect the utility poles on a predetermined basis of a number of years as, for example, every six to ten years, to determine if they are decayed to a state where they must be replaced. It is known in the art to employ three methods of checking these utility poles. One method of testing is to bore a hole in the pole. Another method of testing is to transmit X-rays through the poles and a third method is by sounding. In the sounding method, an operator produces an impact upon the pole and the operator listens to the sound of the impact to determine from experience if the sound of the pole indicates that the pole is defective. Each of these methods exhibits numerous disadvantages. For example, the boring process is destructive and is inaccurate because the hole bored into the utility pole could miss the decayed part. The X-ray method is expensive and, if the pole is covered by tar or other similar bitumen, the X-ray pictures are not clear. The sounding depends upon experience of the operator hitting the pole and the ability of his hearing to detect differences in sound radiating from a solid pole from the sound radiating from one that is decayed. Such a method is subject to extensive human error.

Accordingly, it is an object of this invention to provide an improved testing method and apparatus for testing trees, wood posts and poles.

It is another object of this invention to employ an acoustical testing method and apparatus to test trees, wood posts and poles for determining the condition of the test piece on the basis of the transmission of acoustical energy through the test piece.

Still another object of this invention is to provide acoustical testing methods which are fast, accurate, inexpensive and nondestructive.

Yet another object of this invention is to provide an acoustical testing apparatus for testing wood workpieces which apparatus is inexpensive and yields reliable results.

In accordance with the aspects of this invention I have discovered that acoustical energy, such as sound energy, when produced by an impact, is attenuated as a function of frequency. The magnitude of such attenuation is dependent upon the condition of the workpiece, that is, a good workpiece such as a good utility pole, attenuates acoustical energy in a manner different from the attenuation of a bad workpiece, such as, a bad utility pole. This difference is manifest in two distinct manners. One manner being, the duration of the energy pulse transmitted through the test piece. A longer duration pulse being characteristic of the bad test piece and a short duration pulse characteristic of a good test piece. The second manner in which this difference is manifest involves the frequency of the wave in a test piece, the wave from a good test piece being constituted of a higher frequency than the wave from a bad test piece.

In accordance with the sound transmission aspect of this invention, I provide a test method for a word workpiece which includes the steps of generating acoustical energy at one surface of the workpiece, and detecting the transmitted acoustical energy on the opposite side of the workpiece and either simultaneously producing a visual image of the energy transmitted or subsequently reproducing the energy transmitted in visible form.

In accordance with a more specific aspect of this invention I have discovered that acoustical energy, such as, that generated by the impact from a hammer or other device can be employed in combination with an acoustical energy transducer such as a sonic transducer to determine the acoustical energy dissipation and transmission properties of a wooden workpiece and thus determine its condition. The sonic transducer may be coupled to an electrically responsive reproducer such as an oscilloscope or a paper tape and recording pin arrangement to produce a visual image of the waves transmitted through the workpiece. If an oscilloscope is employed, a camera may be used to photograph the waveform on the oscilloscope. Alternatively, the transducer may be employed with a recorder, such as a magnetic tape recorder, to make a permanent record of the transmission through the workpiece, which permanent record may be later employed in combination with an oscilloscope, or a tape and pin arrangement, for giving a visual record of the transmission through the workpiece. Alternately, the transducer may be employed with an instrument such as a wave analyzer which will determine the magnitude of the various wave lengths of the sound impulse transmitted through the workpiece. The latter system obviates the necessity of visual reproduction of the transmitted sound. The condition of the workpiece being determined by a comparison of the low frequency versus high frequency output of the wave analyzer. In this sonic testing, the term "low frequency" means frequencies of the order of 100 to 400 c.p.s. and the term high frequencies means frequencies of the order of 1500 to 3000 c.p.s. Advantageously, this novel acoustical wood testing method and apparatus can be rapidly and inexpensively employed to nondestructively and accurately determine whether a workpiece is defective. If it is desired to further determine the extent and location of the decay, or defect, X-ray tests may subsequently be employed. This novel acoustical testing method and apparatus, however, eliminates the need for testing by means of X-rays a large number of poles which can be more quickly determined to be good.

These and various other objects and features of the invention will be more clearly understood from a reading of the detailed description of the invention in conjunction with the drawings in which.

Figure 1:
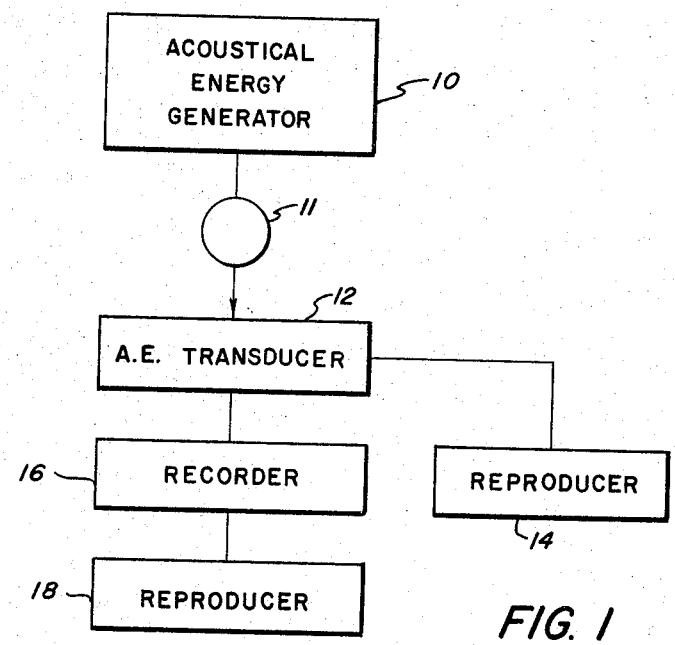
FIGURE 1 is a block diagram of an acoustical testing method and apparatus according to one illustrative embodiment of this invention.

Referring now to FIGURE 1, there is depicted in block form one testing method according to this invention. As therein depicted, an acoustical energy generator 10 is employed to generate acoustical energy which is applied to the wooden workpiece, such as a pole 11, and an acoustical energy transducer 12 is preferably located on the opposite side of the pole 11 from the generator 10 to generate an electrical signal in accordance with the acoustical energy transmitted through the pole 11. When the acoustical energy is converted to an electrical signal in the transducer 12, it may be transmitted to a reproducer 14, such as a cathode ray oscilloscope, an oscillograph, or a wave analyzer. The important aspect of the reproducer 14 is that it be a faithful reproduction of the electrical energy generated in the transducer in accordance with the acoustical energy transmitted through the workpiece 11. If a simultaneous visual indication is not required, the transducer 12 may be connected to a recorder 16 which records the electrical signal from the transducer 12 and the recorder 16 may subsequently, or simultaneously be employed to deliver a signal to a reproducer 18 which gives a visual indication of the energy transmitted through the workpiece where it may be compared with a standard, which standard constitutes a transmission pattern for the same type of wood as that being tested.

Figure 2:
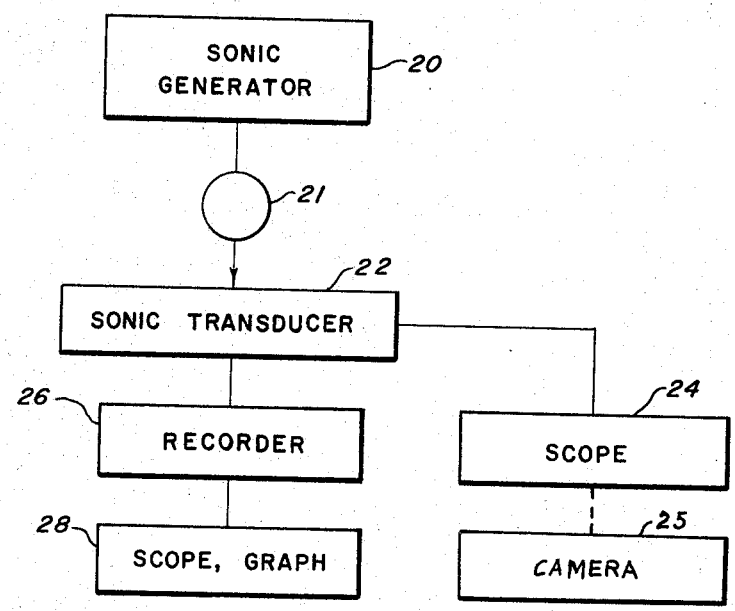
FIGURE 2 is a similar block diagram of another illustrative embodiment of method and apparatus according to this invention.

FIGURE 2 shows in block form a preferred embodiment of this invention. As therein depicted, a sonic generator 20 produces sonic energy on one surface of a utility pole 21, which energy is received by a sonic transducer 22 on the opposite side of the pole 21. This energy is converted directly to electricity which, in turn, is converted to a visual indication from a wave analyzer. This indication may be observed by the operator. It is not essential that the electrical energy, or waveform, generated by the sonic transducer in response to the receipt of sonic energy, be converted into a visible image but rather the evaluation can be made on the output of the wave analyzer.

Figure 3:
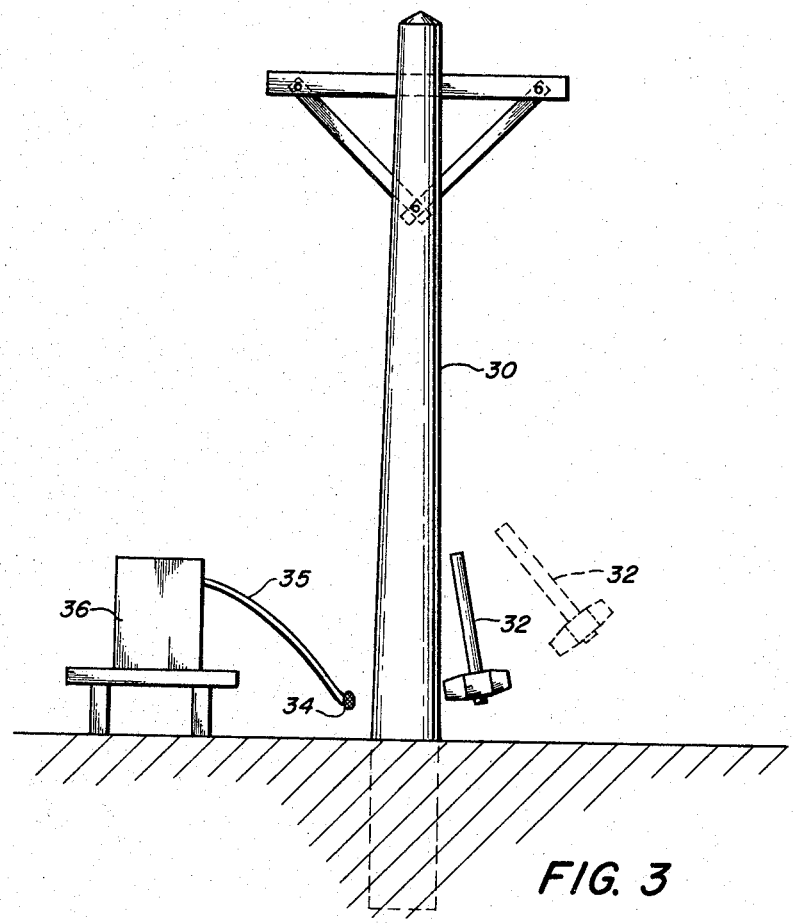
FIGURE 3 is a combined pictorial and block diagram of the specific illustrative embodiment of FIGURE 2.

FIGURE 3 represents pictorially one illustrative embodiment of this invention. In FIGURE 3 a utility pole 30 is to be tested in accordance with this novel method and with this novel apparatus. In producing the sonic impulse an operator employs a hammer 32 to strike the pole 30, preferably near the ground 33, as indicated by the dashed and solid lines of the hammer 32. Opposite the hammer with respect to the pole 30 is a sound transducer, such as a microphone 34, which is connected through a suitable cable 35 to a magnetic tape recorder 36. The pole is struck with an impact implement, which in this particular instance is a hammer 32, and the points of impact may be moved around the pole. In other words, the operator may strike the pole at different points around the pole's surface, preferably close to the ground 33 because decay usually starts within two feet of ground level. Although a hammer 32 is shown, a constant impact hammer could be employed which may be of the spring loaded type, one example of which is shown in Gallagher et al. Patent No. 2,549,076, issued Apr. 17, 1951. By employing a constant impact hammer uniformity of results is assured and direct comparisons may be made of the reproduced waves as recorded on the tape recorder 36. The magnetic tape record produced by the tape recorder 36 may be subsequently employed to produce an electrical signal which is applied to an oscilloscope for the purpose of producing visual images of recorded waves. It is, of course, well known in the art that waves, or waveforms, produced on an oscilloscope may be photographically reproduced by taking pictures of the cathode ray screen, as indicated in respect to FIGURE 2, or the electrical signal may be employed to drive a suitable graph producing device such as a pen and paper strip type. In either arrangement, the waves transmitted through the utility pole are compared with that of a standard, or good pole of the same type wood, and one example of this comparison may be had by comparing FIGURES 4 and 5.

Figure 5:
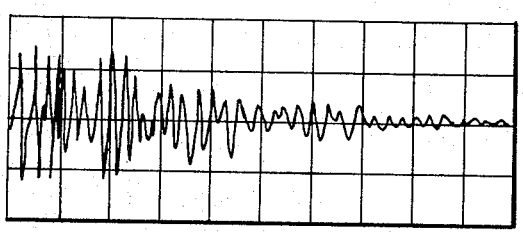
FIGURE 5 is a time plot of energy transmitted through a defective wooden workpiece to the same scale as FIGURE 4.
Figure 4:
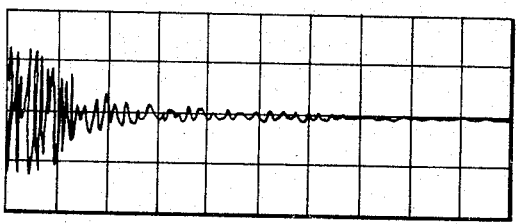
FIGURE 4 is a time plot of energy transmitted through a wooden workpiece of good quality.

FIGURE 4 is a graphical reproduction of the waveform of a sonic pulse transmitted through a good utility pole, or wood workpiece, and FIGURE 5 is a corresponding time plot of the sonic transmission through another utility pole, or wood workpiece of the same type wood as in FIGURE 4, which is defective. A comparison of FIGURES 4 and 5 clearly indicates that at some point in time, which is approximately the end of the second tenth of the interval depicted in the time plot of FIGURE 4, the sonic wave is greatly attenuated by the good wood workpiece. In contrast, however, the time plot of FIGURE 5 clearly indicates that the sonic impulse transmitted through a defective workpiece attenuates somewhat logarithmically rather than abruptly as in the case of FIGURE 4 and, accordingly, this time plot indicates a defective pole, or wood workpiece. Further comparison of the two figures clearly shows that the frequency of the sound wave in FIGURE 4 is primarily in the 1000 cycles per second range while the frequency of the sound wave in FIGURE 5 is primarily in the 200 to 500 cycles per second range. This frequency differential is the second parameter on which the evaluation of the condition of the test piece is made.

While I have shown and described certain illustrative embodiments of this invention, it is understood that the concepts thereof may be applied to other embodiments without departing from the spirit and scope of this invention.

What I claim is:
1. An acoustical wood testing apparatus comprising:
 (a) means for generating acoustical energy by a shock that is dissipated in a broad band of frequencies in an elongated wood, nonhomogeneous utility pole to be tested in a position with one end mounted rigidly in the ground, said shock being generated at the ground level on said utility pole;
 (b) an acoustical energy transducer positioned on the surface of said utility pole at a position diametrically opposite to the position where said shock is generated; and,
 (c) wave analyzer means coupled to said transducer for producing a meter deflection indicating the energy distribution as a function of frequency of the acoustical energy transmitted through said utility pole from said generating means to said transducer.

2. In a method for testing an elongated wood, nonhomogeneous utility pole, which is in a position with one end mounted rigidly in the ground, the steps comprising:
 (a) applying an impact on one surface of said pole at the ground level to generate acoustical energy by a a shock that is dissipated in a broad band of frequencies;
 (b) receiving the acoustical energy transmitted transversely through said pole;
 (c) producing a visible image as a function of frequency representative of the transmitted energy; and,
 (d) comparing said image with an image produced by employing the previous steps on other known poles of the same type wood.

References Cited
UNITED STATES PATENTS 2,549,076   4/1951   Gallagher et al.  _____ 73—67
3,237,445   3/1966   Wood  _____ 73—67.5

FOREIGN PATENTS 156,338   11/1963   Russia.

OTHER REFERENCES

"The Panoramic Analyzer," vol. 1, No. 1, October 1958, published by Panoramic Radio Products, Inc., Mount Vernon, N.Y. (Copy in Group 285, 73–71.4), 4 pages.

JAMES J. GILL, *Primary Examiner.*